US009183365B2

(12) United States Patent
Taveau et al.

(10) Patent No.: US 9,183,365 B2
(45) Date of Patent: Nov. 10, 2015

(54) METHODS AND SYSTEMS FOR FINGERPRINT TEMPLATE ENROLLMENT AND DISTRIBUTION PROCESS

(71) Applicant: Synaptics Incorporated, San Jose, CA (US)

(72) Inventors: Sebastien Ludovic Jean Taveau, Redwood City, CA (US); Marcia Tsuchiya, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 126 days.

(21) Appl. No.: 14/146,865

(22) Filed: Jan. 3, 2014

(65) Prior Publication Data
US 2014/0195815 A1 Jul. 10, 2014

Related U.S. Application Data

(60) Provisional application No. 61/748,851, filed on Jan. 4, 2013.

(51) Int. Cl.
*G06F 21/32* (2013.01)
*G06F 21/31* (2013.01)
*G06F 21/34* (2013.01)

(52) U.S. Cl.
CPC .................................... *G06F 21/32* (2013.01)

(58) Field of Classification Search
CPC ....... G06F 13/102; G06F 21/21; G06F 21/32; G06F 21/34; H04L 63/08
USPC ........... 713/182–186; 726/1–7, 16–21, 27–29
See application file for complete search history.

(56) References Cited

U.S. PATENT DOCUMENTS

| 5,930,804 A | 7/1999 | Yu et al. |
|---|---|---|
| 6,134,340 A | 10/2000 | Hsu et al. |
| 6,182,221 B1 | 1/2001 | Hsu et al. |
| 7,502,761 B2 | 3/2009 | Siegal et al. |
| 7,589,832 B2 | 9/2009 | Den Boef et al. |
| 7,685,629 B1 | 3/2010 | White et al. |
| 8,078,885 B2 | 12/2011 | Jobmann |
| 8,112,787 B2 | 2/2012 | Buer |
| 8,421,595 B2 | 4/2013 | Cassone |
| 8,447,977 B2 | 5/2013 | Slick et al. |
| 2004/0260657 A1 | 12/2004 | Cockerham |
| 2005/0177750 A1 | 8/2005 | Gasparini et al. |
| 2007/0180263 A1 | 8/2007 | Delgrasso et al. |
| 2007/0245152 A1 | 10/2007 | Pizano et al. |

(Continued)

*Primary Examiner* — Joseph P Hirl
*Assistant Examiner* — Kalish Bell
(74) *Attorney, Agent, or Firm* — Leydig, Voit & Mayer, Ltd

(57) ABSTRACT

A system and method may comprise providing a database comprising a user list and a user device list, the user list comprising a list of user biometric identifiers, each extracted from and unique to a respective template of a user biometric of a verified user, and the user device list comprising a list of user biometric identifiers each extracted from and unique to a respective template of a user biometric of a verified user device associated with the verified user; and determining one of (1) whether a user biometric identifier of a known user biometric received from an unverified user device matches a user biometric identifier on the user device list and (2) whether a user biometric identifier extracted from and unique to a new user biometric template received from a verified user device matches a user biometric identifier in the stored user list.

20 Claims, 7 Drawing Sheets

(56) References Cited

U.S. PATENT DOCUMENTS

| | | |
|---|---|---|
| 2008/0155269 A1 | 6/2008 | Yoshikawa |
| 2010/0026451 A1 | 2/2010 | Erhart et al. |
| 2010/0082791 A1 | 4/2010 | Liu et al. |
| 2010/0083000 A1 | 4/2010 | Kesanupalli |
| 2010/0257369 A1* | 10/2010 | Baker .......................... 713/186 |
| 2011/0082791 A1* | 4/2011 | Baghdasaryan et al. ........ 705/44 |
| 2011/0083016 A1* | 4/2011 | Kesanupalli et al. ......... 713/180 |
| 2014/0173639 A1* | 6/2014 | Stufflebeam et al. ......... 719/321 |

* cited by examiner

METHODS AND SYSTEMS FOR FINGERPRINT TEMPLATE ENROLLMENT AND DISTRIBUTION PROCESS

RELATED CASES

This application claims the benefit of U.S. Provisional Application No. 61/748,851, filed on Jan. 4, 2013, entitled METHODS AND SYSTEMS FOR FINGERPRINT TEMPLATE ENROLLMENT AND DISTRIBUTION PROCESS, the disclosure of which is incorporated herein in its entirety.

BACKGROUND

A computing device (such as a desktop, laptop or smartphone) can perform biometric user authentication in several steps. Initially, a user enrolls with the biometric user authentication system by binding their user credentials with the user's biometric template (a "fingerprint template" in specific implementations). The biometric template contains information related to the user's biometric characteristics (also referred to as "biometric information") obtained from a biometric sensor that scans or reads the user's biometric characteristics, such as a fingerprint. A user identification process identifies a particular user among multiple enrolled users (e.g., multiple users enrolled with a particular device, system or biometric sensor). A user verification process verifies that the user who provides their biometric information is who they claim to be by comparing the user's biometric information with the biometric template obtained during enrollment of that user.

For some service providers, such as service providers relating to payment for goods or services, the enrollment process is usually critical. Often, regulations dictate what can and cannot be done during the payment process. The "Know-Your-Customer" (KYC) and "Anti-Money Laundering" (AML) rules require a strong verification of the identity of the person claiming to be the owner of an account, payment instruments, etc. This verification is typically performed by an "accredited facility" such as by a banking agency, by a telecommunications store, or by other means of "physically" verifying the documents provided by the person. Specifically, the identity of the person is matched (e.g., by a clerk) to an officially issued or recognized government document.

The steps taken to identify an individual can be bypassed or may even fail by clever "hatted" personalities. For example, someone may provide identification from a foreign country that a clerk cannot confirm with certainty the genuine nature of the document.

This process is typically possible at a government level by matching the identity of a person to data in an automated fingerprint identification system (AFIS) database. Performing this authentication on a consumer's computing device, however, is often much more challenging. This authentication may be performed on the consumer's computing device via a one-time enrollment to a service with the clerk verifying some documentation and maybe authorizing the provisioning of a payment instrument linked to the now locally created fingerprint template.

However, when a fingerprint template is created, it is typically stored only within that specific computing device. Thus, this step is usually performed only once. Users do not want to have to return to the facility in order to enroll and create a template on another device. Further, users do not want to carry all of their devices into the facility at the same time in order to enroll and validate the user on all of his or her devices. Additionally, users change devices on a regular basis, which heightens this problem further.

SUMMARY

The present disclosure relates to systems and methods for extrapolating a unique identifier from a template that can then be stored in a remote database and still be used across other devices. If someone hacks the remote database (the most common hack), then only a list of identifiers with no meaning can be seen, which will be understood to protect such locally stored (e.g., on the user device(s), e.g., a trusted master device, or one of a number of trusted master devices, such items as, e.g., source details.

In one aspect, a method and system include a database including a user bucket and a device bucket. The user bucket includes an identifier for each verified user in a plurality of verified users and the device bucket includes an identifier for each verified device in a plurality of verified devices. An interpreter and bucket matcher determines an identifier to transmit to a first device based on a known template of an existing user in the plurality of verified users or based on a known device in the plurality of verified devices.

The interpreter and bucket matcher further transmits the identifier to a second device known in the plurality of verified devices after the second device switches into a secure mode and to enable the second device to receive a template via a proxy channel from the first device.

A system and method are disclosed which may comprise providing a database comprising a user list and a user device list, the user list comprising a list of one or more user biometric identifiers, each user biometric identifier extracted from and unique to a respective template of a user biometric of a verified user, and the user device list comprising a list of one or more user biometric identifiers each extracted from and unique to a respective template of a user biometric of a verified user device associated with the verified user; and determining, via an interpreter/matcher one of (1) whether a user biometric identifier of a known user biometric received from an unverified user device matches a user biometric identifier on the user device list to verify the unverified user device and (2) whether a user biometric identifier extracted from and unique to a new user biometric template received from a verified user device matches a user biometric identifier in the stored user list to verify the new user biometric template.

The system and method may further comprise the template of the user biometric comprising information relating to the biometric characteristics of a user biometric sensed by a trusted user biometric image sensor. The template of the user biometric may be created in the trusted biometric image extractor sensor. The service provider database may be connected to a service provider server. Verifying a new user device may add the new user device to the user device list in the service provider database comprising a cluster of user devices associated with the user. Verifying the new user biometric template may add to the user list in the service provider database another user biometric associated with the user. The user biometric identifier may be an encrypted version of the user biometric template.

A system and method is disclosed which may comprise storing in a service provider database a user list and a user device list, the user list comprising a list of one or more user biometric identifiers, each user biometric identifier extracted from and unique to a respective template of a user biometric of a verified user, and the user device list comprising list of one or more user biometric identifiers each extracted from and unique to a respective template of a user biometric of a verified user device associated with the verified user; and determining, via an interpreter/matcher, whether a user biometric identifier extracted from and unique to a new user biometric template, received from a verified user device, matches a user biometric identifier in the stored user list to verify the new user biometric template; and authorizing a verified user device containing a stored master template identified by the user biometric identifier contained in the user list to transfer to the user device which transmitted the verified new user biometric template, a verified master template, to create a new root of trust and user biometric identifier for storage in the user list and the user device list.

The system and method may comprise wherein the transfer is accomplished by way of a short range wireless network. The short range wireless network may be one of a Bluetooth wireless ("BT wifi"), Bluetooth low energy ("BLE") and/or near-field communication ("NFC") network.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
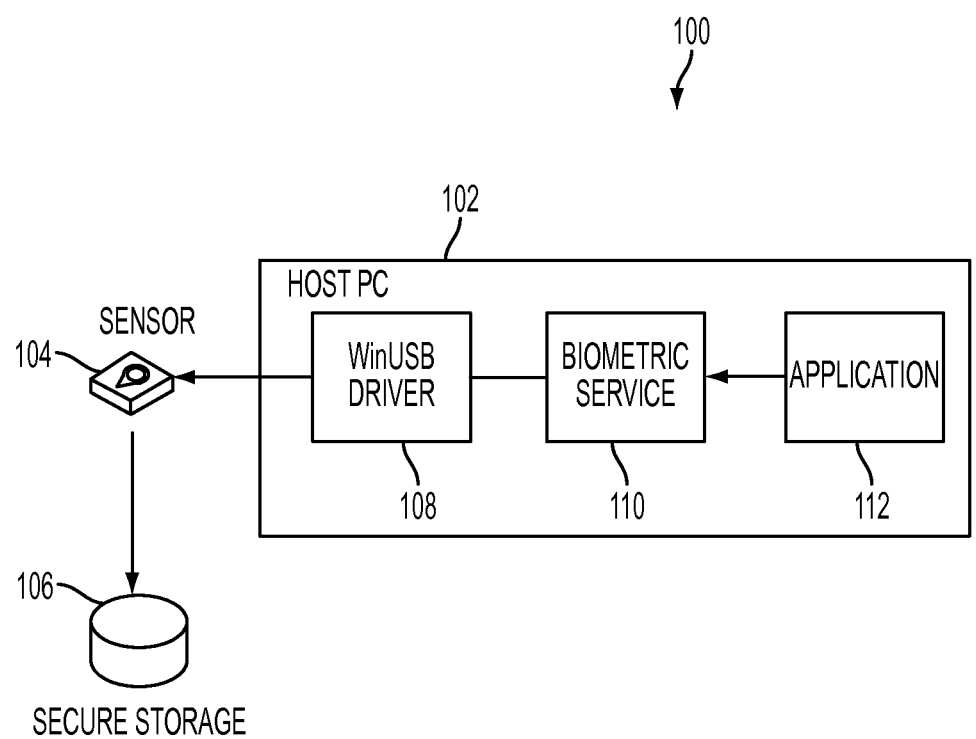
FIG. 1 depicts an example system capable of performing biometric user enrollment and authentication in accordance with an embodiment of the disclosed subject matter.

The systems and methods described herein relate to biometric authentication of users. "Biometrics" and "biometric information" refers to measurable biological characteristics of a user, such as a fingerprint, facial characteristics, eye characteristics, voice characteristics (also referred to as a "voiceprint") and the like. As discussed herein, biometric information provides an additional level of security when used in systems and procedures related to authentication of a user.

Particular examples discussed herein use fingerprint biometric information to authenticate one or more users. In other embodiments, any type of biometric information may be used instead of fingerprint information. Additionally, a particular embodiment may utilize multiple types of biometric information (e.g., fingerprints and voiceprints) to authenticate a user. Certain described embodiments include an application to "swipe" style fingerprint sensors. However, as will be appreciated by those skilled in the art, alternate embodiments may include any type of fingerprint sensor, such as a "placement" sensor. In some embodiments, the biometric sensor is configurable such that it is physically attached to (or manufactured into) a client device, such as a computer, electronic device, cellular phone, tablet, and so forth. In other embodiments, the biometric sensor is a portable device that is coupleable to the client device (e.g., a pluggable USB device) for enrollment and/or authentication procedures. Coupleable devices are configurable to provide temporary sensor capability and to enable a sensor to be used for a plurality of devices.

As will be appreciated by those skilled in the art, a "web application", a "web-based application", and a "web-enabled application" includes a software application or software routine that is capable of communicating with one or more web servers or similar devices via the Internet or other data communication network. Additionally, a "plug-in" or a "browser plug-in" includes an application or extension that provides a variety of different features and functions. Particular examples of "plug-ins" and "browser plug-ins" discussed herein provide features and functions related to user authentication while, for example, accessing web sites, making secure transactions, and the like. In particular embodiments, the browser plug-in is installed as part of the manufacturing process of devices equipped with associated biometric devices. In specific implementations, the browser plug-in is operable with any biometric device that supports the Windows Biometric Framework or other supported architectures or systems.

Typical passwords do not provide any physical authentication of the user's identity. Thus, any person or machine can access a user's Web-based accounts and related information if they gain knowledge of the user's password and username. Using biometric information in the user authentication process provides an increased level of security by authenticating physical characteristics of the user. Thus, an imposter with the correct password but lacking the required physical characteristics will not be authenticated by the system.

Initially, a user enrolls with the biometric user authentication system by binding their user credentials with the user's biometric template (a "fingerprint template" in specific implementations). The biometric template contains information related to the user's biometric characteristics (also referred to as "biometric information") obtained from a biometric sensor that scans or reads the user's biometric characteristics, such as a fingerprint. A user identification process identifies a particular user among multiple enrolled users (e.g., multiple users enrolled with a particular device, system or biometric sensor). A user verification process verifies that the user who provides their biometric information is who they claim to be by comparing the user's biometric information with the biometric template obtained during enrollment of that user. The enrollment, identification and verification of users is discussed in greater detail herein.

During an example enrollment process that uses a fingerprint sensor as the biometric sensor, a user swipes their finger across the fingerprint sensor several times to create a fingerprint template. The fingerprint template contains qualitative fingerprint information that allows the user's fingerprint to be distinguished from fingerprints associated with other users. In alternate embodiments, a placement fingerprint sensor (also referred to as a static fingerprint sensor) is used such that a user places their finger on the fingerprint sensor rather than "swiping" their finger across the fingerprint sensor. After creating a fingerprint template, the user (or a web server or other system) provides user credentials, such as a password, cryptographic key, random seed, and the like. The systems and procedures described herein bind the user's fingerprint template with the user credentials. The fingerprint template and user credentials are then stored in a secure storage device. In one embodiment the secure storage device is contained within the fingerprint sensor hardware. In other embodiments, the secure storage device is contained in a device that utilizes the fingerprint sensor.

During an example user identification process (also referred to as a user verification process), a user swipes their finger across a fingerprint sensor. The process then determines whether the user's fingerprint information matches a fingerprint template associated with the fingerprint sensor. If the user's fingerprint information matches a fingerprint template, the user's credentials are released to the user and/or a service or process requesting the user verification. Thus, the user credentials are not released from the secure storage device until a matching fingerprint template is confirmed. In particular embodiments, the user credentials released as a result of a match with a fingerprint template are not necessarily the same credentials provided by the user during the enrollment process. For example, the user credentials released after finding a matching fingerprint template may include an OTP (One Time Password) token, RSA signature and the like. The enrollment process can be initiated by a Web server, a Web browser plug-in, and the like.

The described systems and methods communicate user credentials to a specific address, location, or other recipient identifier. Thus, even if an imposter can gain access to the user credentials, the system will send those user credentials to a predetermined address or location, thereby preventing the imposter from attempting to have the user credentials sent to an alternate address or location. The address or location information is stored within the user credentials and is established as part of the enrollment process.

Particular embodiments of the systems and methods discussed herein use strong cryptographic algorithms implemented in hardware and/or software. Example cryptographic algorithms include AES (Advanced Encryption Standard) 256, SHA (Secure Hash Algorithm) 256 and RSA 2048. Example biometric sensors are compatible with various standards, such as OATH-OCRA (OATH Challenge/Response Algorithms), TOPT (Time-based One-time Password Algorithm), HOPT (HMAC-Based OTP Algorithm) and PKCS (Public Key Cryptography Standards) #11, RSA SecureID based OTP, and the like.

In one embodiment, each biometric sensor has a unique identifier (ID) that is used to strengthen the level of security provided by the system or process. This unique ID provides an additional authentication factor representing "something you have". Since each biometric sensor has a unique ID, each user's biometric template and user credentials can be uniquely associated with a specific biometric sensor.

Specific implementations include a biometric sensor as part of a multi-component or multi-element authentication system. Particular embodiments may include one or more authentication factors, such as: 1. something you are; 2. something you have; and 3. something you know.

In example embodiments, a web site that supports the authentication procedures discussed herein includes an HTML (Hyper Text Markup Language) tag that identifies a web browser plug-in (also referred to as a "biometric plug-in") that is installed on the user's computing device. This HTML tag indicates to the browser that the web site supports biometric authentication. Other example embodiments include an extension of an existing web browser plug-in. Further implementations may utilize a browser helper object, ActiveX control, Browser Extension, or other approaches. In particular implementations, the web browser plug-in obtains the biometric sensor's unique ID and communicates that unique ID (or a hash of the unique ID) to a web server via HTTP or HTTPS.

When a user accesses the web site, the web browser plug-in is activated and detects that a biometric sensor is installed in the user's computing device. The web site suggests that the user enroll with their biometric sensor to provide a more secure user authentication. If the user accepts, the web browser plug-in activates the enrollment process to enroll the user. This enrollment process includes binding the web site to the specific user. The web site then generates a secret key and passes the secret key to the user's computing device via a secure connection between the web site and the user's computing device. In a particular implementation, the "enrollment" process includes enrolling the user's fingerprint and generating a secret key.

If the user also wants to bind their computing device with web site authentication, the web browser plug-in sends the biometric sensor's ID to the web site server or other device/system. Multiple embodiments store information in various formats and on various devices or components within a system. Example embodiments may utilize a hash of the shared secret, a hash of the biometric sensor ID, and the like. At this point, the user can select different factors for authentication. In a particular embodiment, the web site may require stronger authentication when an important operation is being performed on the web site, such as accessing a bank account or other sensitive data.

After a user has enrolled with a particular web site that supports biometric authentication, subsequent visits to the same web site cause the web browser plug-in to detect that the user has already enrolled with the web site. In this situation, the web site prompts the user to perform user authentication (e.g., using the biometric device). In the case of a fingerprint sensor, the user swipes their finger across the fingerprint sensor or places their finger on the fingerprint sensor. If the fingerprint information matches a fingerprint template associated with the fingerprint sensor, the web browser plug-in releases user secrets from the user credentials. In particular embodiments, the fingerprint sensor releases an OTP token or an RSA signature instead of plaintext credentials. After the credentials are released, they are communicated to the web site to complete the user authentication process. In specific implementations, the server may generate a random challenge and communicate that challenge to the client device. The web browser plug-in (or the biometric sensor) uses this challenge to construct a response based on the secure key and the random challenge. The response may be a hash of the secure key, a hash of the random challenge, or any other calculation. The server validates the user credentials and authenticates the user if the validation is successful.

In particular implementations, the user performs the enrollment process for each web site the user accesses that supports biometric authentication. Additionally, different user credentials are associated with each web site with which the user enrolls. Thus, if the user enrolls with five different web sites that support biometric authentication, the biometric sensor in the user's computing device stores five separate sets of user credentials, each of which is associated with one of the five different web sites. Additionally, if different users access the same web site, separate user credentials and separate biometric templates are maintained for each user.

Particular embodiments of the web browser plug-in support WBF (Windows Biometric Framework), thereby supporting any biometric device that supports the WBF interface.

The web browser plug-in also supports the Application Programming Interface specified by the BioAPI Consortium.

In alternate embodiments, the systems and methods determine that a web site supports biometric authentication by providing a service or process that monitors web site data and detects certain types of transactions on secure web sites. When a secure transaction is initiated, the systems and methods check the computing device accessing the web site to determine if the computing device includes a fingerprint sensor or other biometric device. If so, an enrollment and/or authentication process is activated to offer an enhanced level of security to the user, as described herein.

FIG. 1 shows an example system 100 capable of performing biometric user enrollment and authentication via a biometric sensor 104 (such as a fingerprint sensor or other biometric device). In this example, a biometric service 110 executes on a host PC 102 and communicates with one or more applications 112 that may request user authentication. Example applications include Internet browser applications, financial applications, and the like. In a particular embodiment, the validity biometric service uses a Windows API (e.g., a WinUSB Driver) 108 to encrypt a fingerprint template database with system account credentials. In alternate embodiments, any type of API or similar interface may be used in place of Windows API 108. Biometric sensor 104 has a unique 128 bit encryption key and a unique identifier (e.g., serial number). The enrolled credentials of a user are encrypted with the encryption key and stored in a storage device, such as secure storage 106. In a particular embodiment, biometric service 110 is implemented as a service application running in a local system account.

In a particular embodiment, application 112 is an Internet browser application executing on host PC 102 and communicating with various web servers via the Internet. Application 112 includes a browser extension or browser plug-in that communicates with biometric service 110. In one implementation, biometric service 110 is a secure application executing in a background mode on host PC 102. Thus, biometric service 110 provides a communication interface to biometric sensor 104. The browser extension (or browser plug-in) associated with application 112 is capable of communicating transaction details, random challenges, signature information, user information, and other data to biometric service 110. Biometric service 110 also communicates with one or more web servers as part of the user enrollment and/or user authentication procedure.

Figure 2:
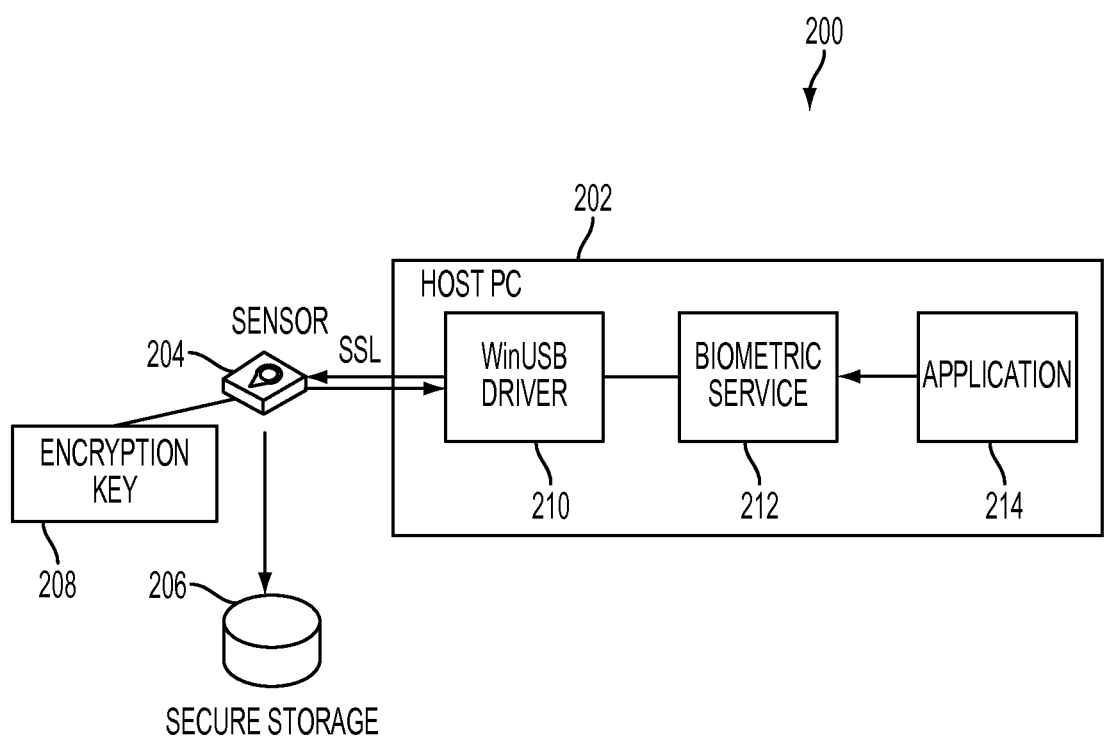
FIG. 2 depicts another example system capable of performing biometric user enrollment and authentication in accordance with an embodiment of the disclosed subject matter.

FIG. 2 shows another example system 200 capable of performing biometric user enrollment and authentication via a biometric sensor 204. System 200 includes a host PC 202, a WinUSB driver 210, a biometric service 212 and an application 214 similar to the components discussed above with respect to FIG. 1. In the example of FIG. 2, the biometric sensor decrypts the user credentials only after a successful biometric reading, such as a fingerprint swipe or fingerprint scan (using a placement style fingerprint sensor). For example, in a successful fingerprint swipe, the swiped fingerprint information matches a fingerprint template associated with the fingerprint sensor. In a particular embodiment, the validity enterprise sensor has a unique 256 bit encryption key 208 and a unique identifier (e.g., serial number). The biometric sensor 204 creates a secure communication with Host PC 202 using SSL v3 protocol or other secure communication technique. In a particular implementation, biometric sensor 204 includes a "match on chip" functionality that releases a user's credentials only upon a successful fingerprint swipe or other biometric reading. User credentials and other information may be stored within biometric sensor 204, in a secure storage 206, or any other storage mechanism. In certain embodiments, the validity biometric service is implemented as a service application running in a local system account.

Figure 3:
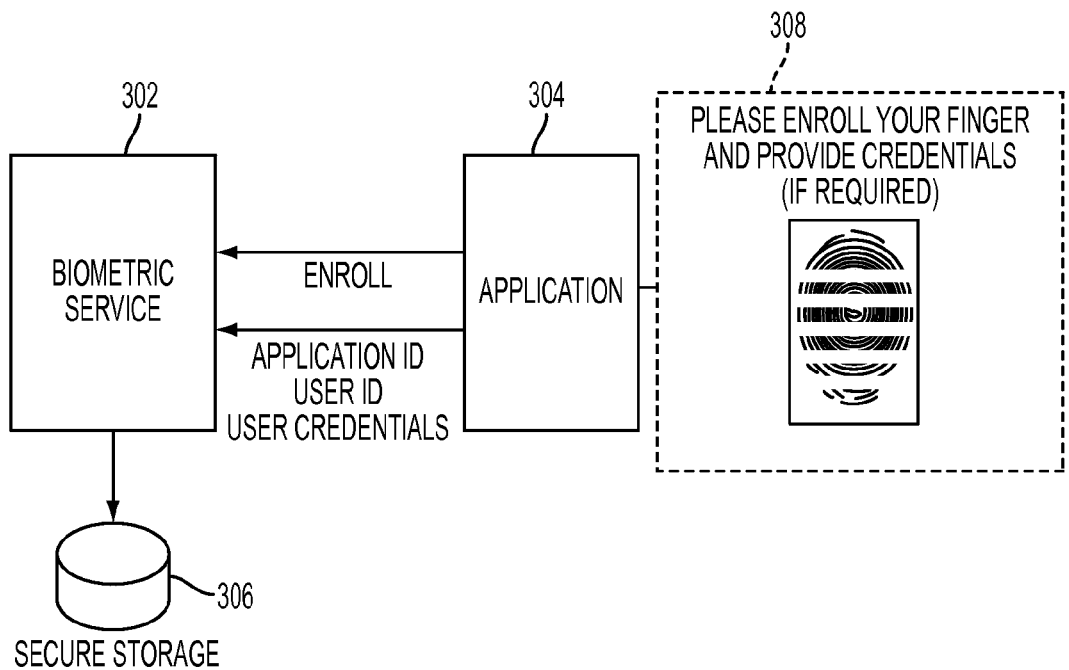
FIG. 3 depicts an example user enrollment process in accordance with an embodiment of the disclosed subject matter.

FIG. 3 shows an example user enrollment process in which the user enrolls using a fingerprint sensor to bind the user's fingerprint template with the user's credentials. An application 304 that desires to enroll a user with a biometric device communicates with a biometric service 302, which is coupled to a secure storage 306. Biometric service 302 is also coupled to a biometric sensor (not shown), which captures biometric data and communicates that data to the biometric service. Application 304 initiates the user enrollment process by displaying a request 308 for the user to provide their fingerprint (in the case of a fingerprint sensor) and provide user credentials. Application 304 communicates a user enrollment request to biometric service 302 as well as information regarding a user identifier (user id), an application identifier, and user credentials. The biometric service then captures the fingerprint data and stores the fingerprint data in secure storage 306. Additional details regarding the user enrollment process are provided herein.

Figure 4:
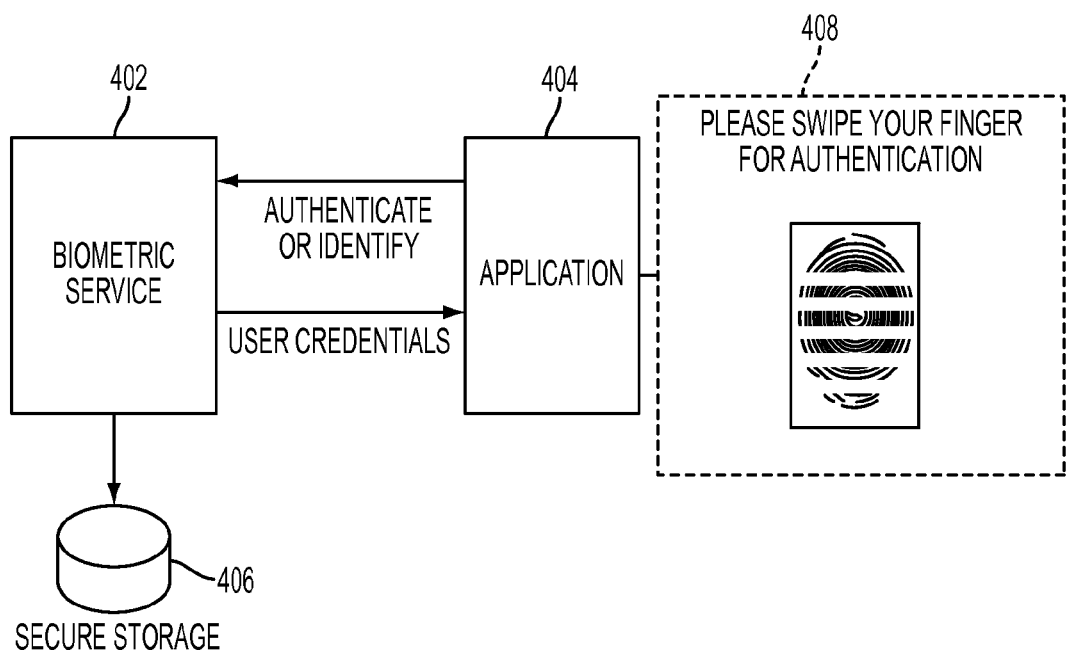
FIG. 4 depicts an example user authentication process in accordance with an embodiment of the disclosed subject matter.

FIG. 4 shows an example user authentication process using a fingerprint sensor. An application 404 that desires to authenticate a user with a biometric device communicates with a biometric service 402, which is coupled to a secure storage 406. Biometric service 402 is also coupled to a biometric sensor (not shown), which captures biometric data and communicates that data to the biometric service. Application 404 initiates the user authentication process by displaying a request 408 for the user to provide their fingerprint (in the case of a fingerprint sensor). Application 404 communicates an authentication and/or identity request to biometric service 402. The biometric service then captures the fingerprint data and identifies user credentials for the user associated with the fingerprint data. The user credentials are then communicated to application 404. Additional details regarding the user authentication process are provided herein.

As described above, to have a user validated based on regulations, the verification in an "accredited facility" such as a bank is necessary. When verification occurs at such an accredited facility, a master template is created. However, when a fingerprint template is created, it is typically stored only within that specific computing device. In one embodiment a user's fingerprint template in a first computing device is copied and transmitted to a second computing device (e.g., via near field communication or secured Wi-Fi or Bluetooth).

Leveraging the secure element in the fingerprint sensor (e.g., sensor 204), a Physical Unclonable Function (PUF) and some unique silicon marking is the "trusted part" of the system. With mobile computing devices such as smartphones, a Trusted Execution Environment (TEE) can be used to switch the sensor driver into the Secure OS execution mode. The TEE is a secure area that resides in the main processor of a mobile computing device (e.g., smartphone) and ensures that sensitive data is stored, processed and protected in a trusted environment. The TEE's ability to offer safe execution of authorized security software, known as "trusted applications", enables it to provide end-to-end security by enforcing protection, confidentiality, integrity and data access rights. The TEE isolates secure applications and keeps them away from any malware which might be downloaded inadvertently.

The master template can then be packaged in such a way to be copied and transmitted securely to a second computing device. Using the same mechanism on the second computing device, the template "prime" is now created and stored. This template is bound to the "trusted or verified" sensor in the second computing device.

In one embodiment, the root of trust is at the level of the sensor capturing the fingerprint. With PUF, Real-time clock, Silicon serial number, ROM, many elements of the device or sensor itself can be leveraged to uniquely "mark" the template and create an actual binding between the device and the user.

If someone can lift a fingerprint in a targeted attack and try to replay it on a new device, the binding between that template and the sensor won't be present. At that point, a verification trigger will occur because of the need to enroll again on a new computing device with a supposedly known fingerprint. This is when the computing device pings a remote database (e.g., of a server computer or in the cloud) for a unique identifier to verify with the user if this is a legitimate request.

A user can scan his or her finger on the original device to validate the new enrollment and then the new device will know which identifier to ping in the future and, from a consumer point of view, the friction is minimal. Multi-device enrollment can be done from this single verified enrollment performed in a facility.

In one embodiment, service providers refer to this as a bucket list. In order to provide consistency across platforms, and to maintain security for remote access, a bucket of known devices associated with a user is set and a bucket of known users on a single device is also set. Now, multiple identifiers can be dropped in any of the buckets and can or cannot be linked with each other. This makes it more difficult for a hacker to trace back the user device that is the root of trust. And the more devices a user binds to her fingerprint, the more roots of trust/verification are created. If one device is not "registered in the bucket" anymore and a new device is about to be added, the user bucket can make a call to another known device in that user bucket.

Figure 5:
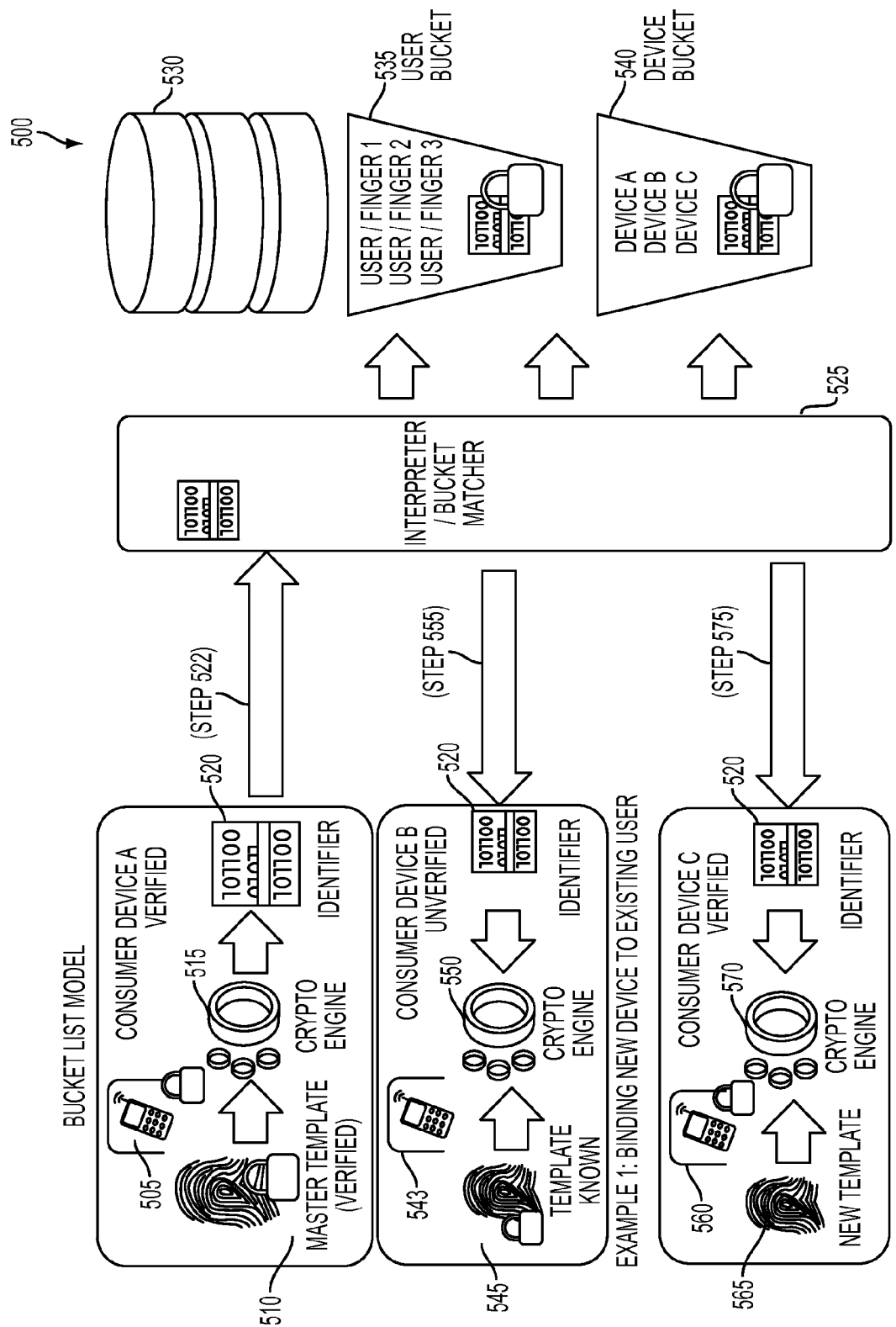
FIG. 5 depicts an example bucket list model in accordance with an embodiment of the disclosed subject matter.

FIG. 5 is a flow diagram illustrating an embodiment of a bucket list model 500. In this example, a first computing device (Consumer Device A) 505 receives a verified master template 510. The master template 510 is a template created on a trusted device in an approved location (e.g., a bank). The Consumer Device A transmits master template 510 to a cryptographic engine 515 to be encrypted. The cryptographic engine 515 produces an identifier 520 for consumer device A 505. The Consumer Device A 505 transmits (Step 522) the identifier 520 over a network (e.g., Internet) to an interpreter/bucket matcher 525 located on a remote computing device (e.g., a server computer). In one embodiment, the interpreter/bucket matcher 525 is a software module executing on a server computer. The interpreter/bucket matcher 525 stores the identifier 520 in a database 530. The database 530 may be an internal database within the server computer or may be an external database in communication with the server computer.

In one embodiment, the interpreter/bucket matcher 525 stores the identifier 520 in a user bucket 535 and associates the identifier 520 with the user (e.g., a user's finger 1 (e.g., thumb), finger 2 (e.g., index finger), finger 3 (e.g., ring finger), etc.). The interpreter/bucket matcher 525 can also store the identifier 520 in a device bucket 540 and associates the identifier 520 with Consumer Device A 505.

Suppose that the user now wants to use a new second computing device (Consumer Device B) 543, which is unverified. The template 545 is known, as this is the same user. The known template 545 is transmitted to the cryptographic engine 550. The interpreter/bucket matcher 525 transmits (Step 555) the identifier 520 to the Consumer Device B. The identifier 520 is associated with the user and is retrieved from the user bucket 535. This identifier 520 is transmitted to the cryptographic engine 550 with the known template 545. Thus, the new Consumer Device B has been binded to an existing user.

In another embodiment, a known device 560, Consumer Device C, is being binded to a new user/finger. A new template 565 is retrieved by the device 560 and transmitted to a cryptographic engine 570. The interpreter/bucket matcher 525 transmits the identifier 520 for the known device from the device bucket 540 to the Consumer Device C 560 (Step 575). The identifier 520 is transmitted to the cryptographic engine 570 with the new template 565 to bind the new user to the Consumer Device C 560.

Figure 6:
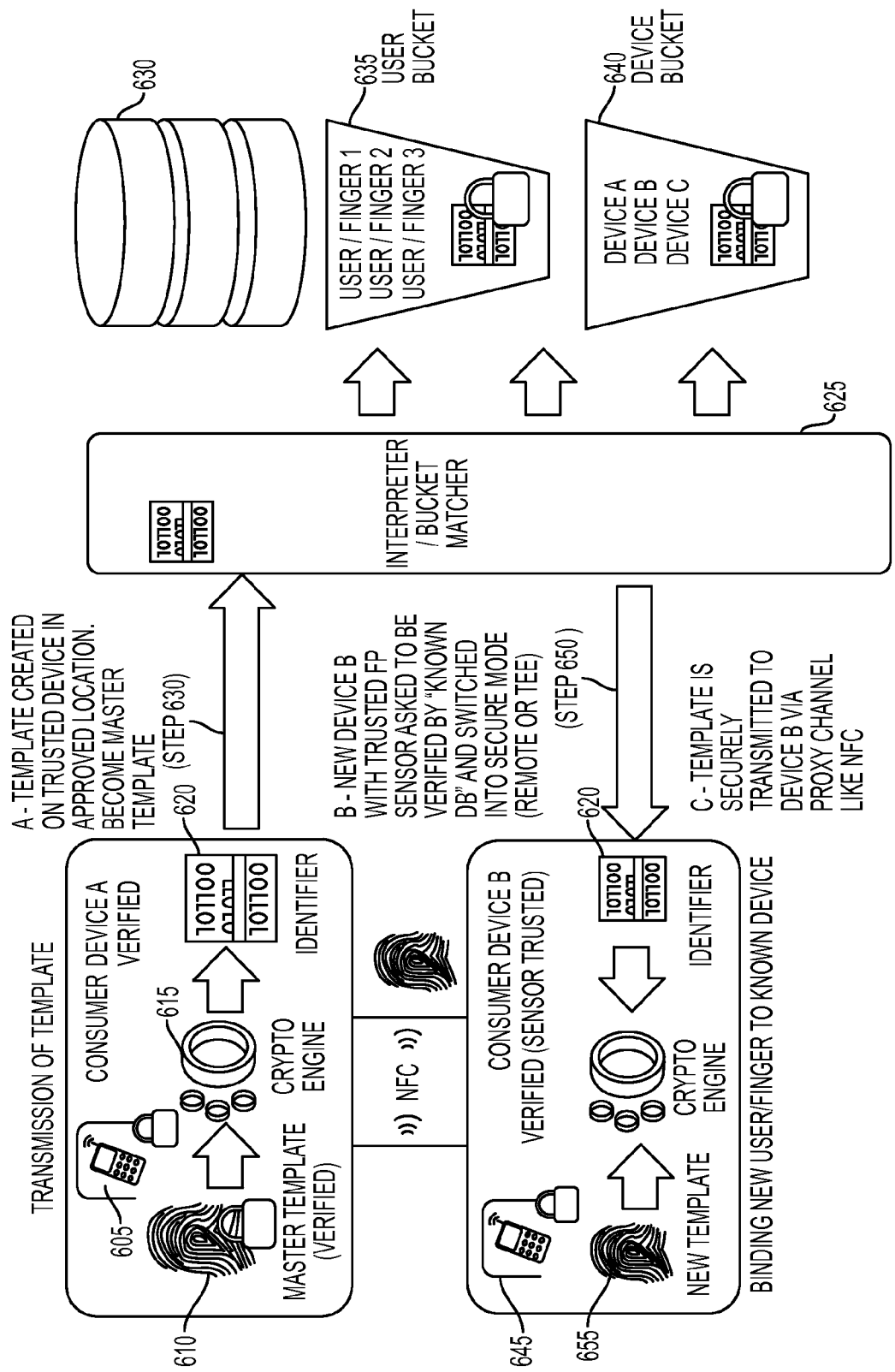
FIG. 6 depicts an example transmission of template from one device to another device in accordance with an embodiment of the disclosed subject matter.

FIG. 6 is a flow diagram of an embodiment of the transmission of a template. A template is created on a trusted device in an approved location (e.g., bank). This template becomes master template 610. The device 605 transmits this master template 610 to a cryptographic engine 615 to produce an identifier 620. The device 605 transmits the identifier 620 to the interpreter/bucket matcher 625 (Step 630). As stated above, the interpreter/bucket matcher 625 stores this identifier in database 630 in a user bucket 635 (e.g., for the thumb of a first user) and/or a device bucket 640 (e.g., for Consumer Device A).

In one embodiment, a new second device 645 (Consumer Device B) with a trusted fingerprint sensor requests to be verified by database 630. The second device 645 is switched into a secure mode (remote or TEE). This device 645 is then verified and the interpreter/bucket matcher 625 transmits (Step 650) the identifier 620 to the device 645. A template 655 is transmitted to Consumer Device B 645 from Consumer Device A via a proxy channel like near field communication (NFC).

Figure 7:
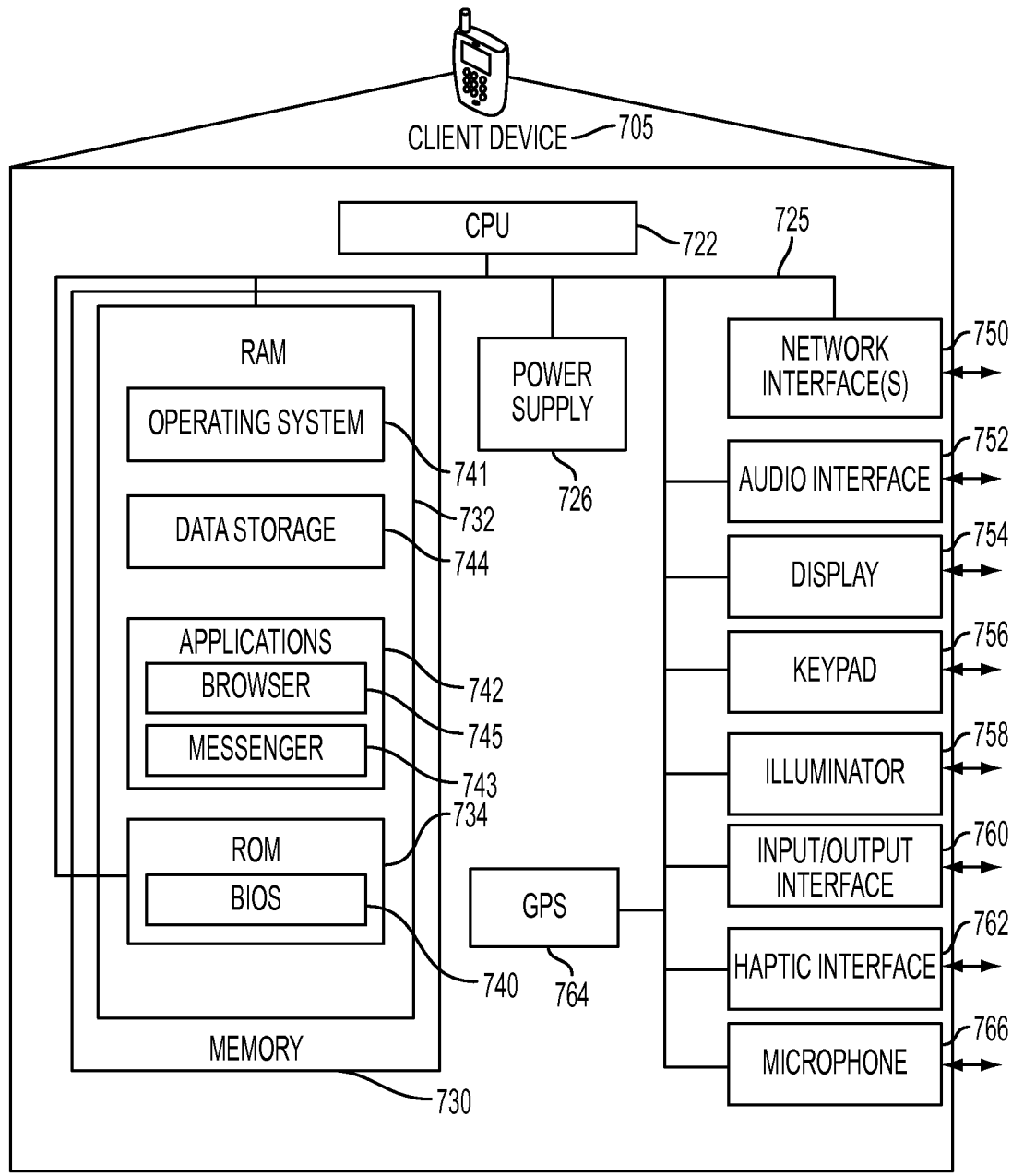
FIG. 7 is a block diagram of components of a consumer device in accordance with the present disclosure.

FIG. 7 shows a schematic diagram illustrating a consumer device 705 (e.g., Consumer Device A, B, and/or C) which may include any suitable computing device capable of sending or receiving signals, such as via a wired or wireless network. A consumer device 705 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The consumer device 705 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, of a display with a high degree of functionality, such as a touch-sensitive color 2D or 3D display, for example.

A consumer device 705 may include or may execute a variety of operating systems, including a personal computer operating system, such as a Windows, iOS or Linux, or a mobile operating system, such as iOS, Android, or Windows Mobile, or the like. A consumer device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. Additionally, a consumer device may also include or execute an application to communicate content, such as, for example, textual content, multimedia content, or the like. Moreover, a consumer device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 7, consumer device 705 may include one or more processing units (also referred to herein as CPUs) 722, which interface with at least one computer bus 725. A memory 730 can be persistent storage and interfaces with the computer bus 725. The memory 730 includes RAM 732 and ROM 734. ROM 734 includes a BIOS 740. Memory 730 interfaces with computer bus 725 so as to provide information stored in memory 730 to CPU 722 during execution of software programs such as an operating system 741, application programs 742, device drivers, and software modules 743, 745 that comprise program code, and/or computer-executable process steps, incorporating functionality described herein, e.g., one or more of process flows described herein. CPU 722 first loads computer-executable process steps from storage, e.g., memory 732, data storage medium/media 744, removable media drive, and/or other storage device. CPU 722 can then execute the stored process steps in order to execute the loaded computer-executable process steps. Stored data, e.g., data stored by a storage device, can be accessed by CPU 722 during the execution of computer-executable process steps.

Persistent storage medium/media 744 is a computer readable storage medium(s) that can be used to store software and data, e.g., an operating system and one or more application programs. Persistent storage medium/media 744 can also be used to store device drivers, such as one or more of a digital camera driver, monitor driver, printer driver, scanner driver, or other device drivers, web pages, content files, playlists and other files. Persistent storage medium/media 744 can further include program modules and data files used to implement one or more aspects of the present disclosure.

As will be appreciated by those skilled in the art, a computer readable medium is configurable such that it stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media thus can include, for example, physical or tangible storage (as opposed to signals) and includes without limitation volatile and non-volatile, removable and non-removable media implemented in any method or technology for the tangible storage of information such as computer-readable instructions, data structures, program modules or other data. Additionally, computer readable storage media can include, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Consumer device 705 can also include one or more of a power supply 726, network interface 750, audio interface 752, a display 754 (e.g., a monitor or screen), keypad 756, illuminator 758, I/O interface 760, a haptic interface 762, a GPS 764, and/or a microphone 766.

A module can be a software, hardware, or firmware (or combinations thereof) system, process or functionality, or component thereof, that performs or facilitates the processes, features, and/or functions described herein (with or without human interaction or augmentation). A module can also include sub-modules. Software components of a module may be stored on a computer readable medium. Modules may be integral to one or more servers, or be loaded and executed by one or more servers. One or more modules may be grouped into an engine or an application.

Figure 8:
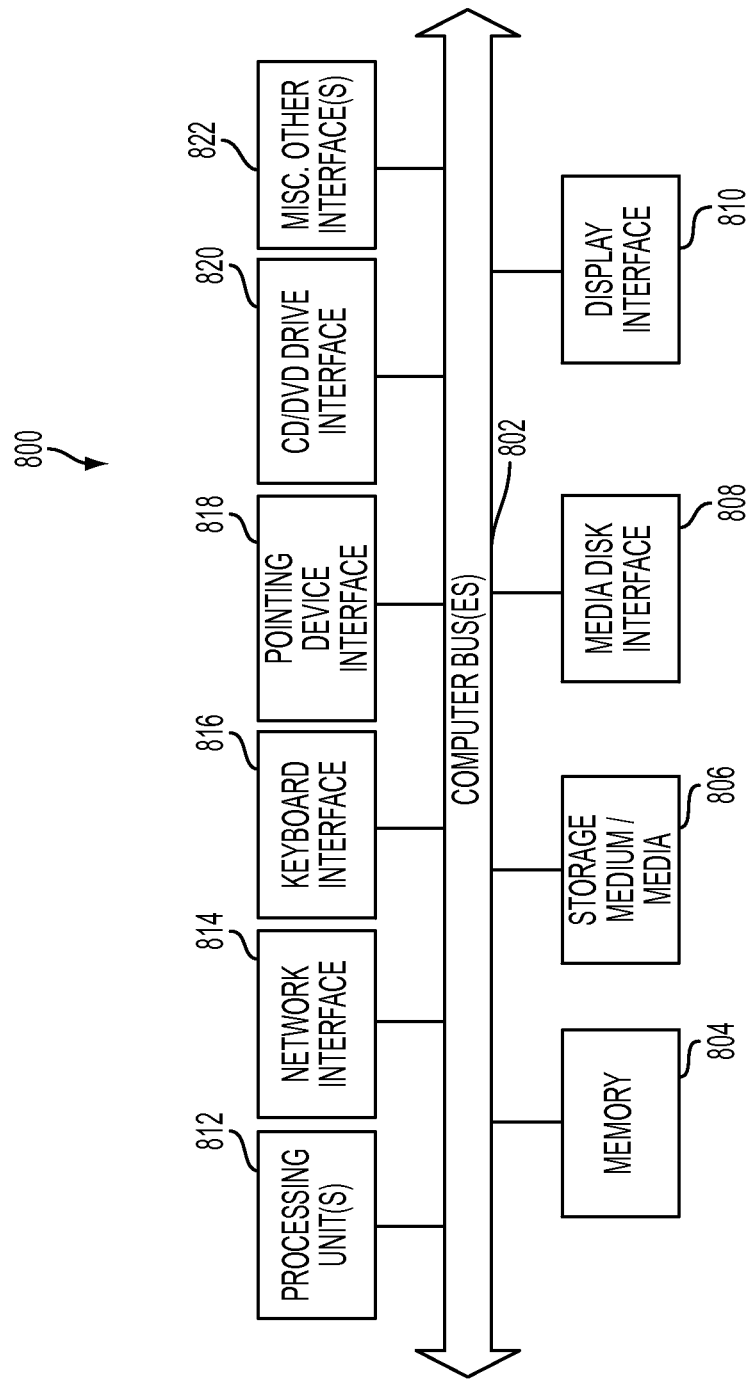
FIG. 8 is a block diagram illustrating an internal architecture of a computer in accordance with the present disclosure.

FIG. 8 is a block diagram illustrating an internal architecture of an example of a computer, such as host PC 102 or a consumer device in accordance with one or more aspects of the present disclosure. A computer can be any device with a processor capable of executing logic or coded instructions, and could, for example, be a server, personal computer, set top box, tablet, smart phone, pad computer or media device, to name a few such devices. As shown in FIG. 8, internal architecture 800 can be configured to include one or more processing units (also referred to herein as CPUs) 812, which interface with at least one computer bus 802. Also interfacing with computer bus 802 are persistent storage medium/media 806, network interface 814, memory 804, e.g., random access memory (RAM), run-time transient memory, read only memory (ROM), etc., media disk drive interface 808 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 is configurable to interface with computer bus 802 to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

As described above, persistent storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, web pages, content files, playlists and other files. Persistent storage medium/media 806 can further include program modules and data files used to implement one or more aspects of the present disclosure.

The methods and systems disclosed can be used in a variety of ways including, for example:

User authentication for device (e.g., phone, tablet, or computer) unlocking

User authentication for online transactions

User authentication for access to device systems and services, including websites and email Replacement of Password and PINs Physical access such as door locks Time and attendance systems (prove you were at a certain place at a certain time)

Finger-based input devices/navigation for mobile phones and gaming

Finger-based shortcuts (authentication of a given finger results in the corresponding action to which that finger is mapped)

Non-repudiation for online transactions

It will be understood that a system and method are disclosed which may comprise providing a database comprising a user list and a user device list, the user list comprising a list of one or more user biometric identifiers, each user biometric identifier extracted from and unique to a respective template of a user biometric of a verified user, and the user device list comprising a list of one or more user biometric identifiers each extracted from and unique to a respective template of a user biometric of a verified user device associated with the verified user; and determining, via an interpreter/matcher one of (1) whether a user biometric identifier of a known user biometric received from an unverified user device matches a user biometric identifier on the user device list to verify the unverified user device and (2) whether a user biometric identifier extracted from and unique to a new user biometric template received from a verified user device matches a user biometric identifier in the stored user list to verify the new user biometric template.

The system and method may further comprise the template of the user biometric comprising information relating to the biometric characteristics of a user biometric sensed by a trusted user biometric image sensor. The template of the user biometric may be created in the trusted biometric image sensor. The service provider database may be connected to a service provider server. Verifying a new user device may add the new user device to the user device list in the service provider database comprising a cluster of user devices associated with the user. Verifying the new user biometric template may add to the user list in the service provider database another user biometric associated with the user. The user biometric identifier may be an encrypted version of the user biometric template.

A system and method is disclosed which may comprise storing in a service provider database a user list and a user device list, the user list comprising a list of one or more user biometric identifiers, each user biometric identifier extracted from and unique to a respective template of a user biometric of a verified user, and the user device list comprising list of one or more user biometric identifiers each extracted from and unique to a respective template of a user biometric of a verified user device associated with the verified user; and determining, via an interpreter/matcher, whether a user biometric identifier extracted from and unique to a new user biometric template, received from a verified user device, matches a user biometric identifier in the stored user list to verify the new user biometric template; and authorizing a verified user device containing a stored master template identified by the user biometric identifier contained in the user list to transfer to the user device which transmitted the verified new user biometric template, a verified master template, to create a new root of trust and user biometric identifier for storage in the user list and the user device list.

The system and method may comprise wherein the transfer is accomplished by way of a short range wireless network. The short range wireless network may be one of a Bluetooth wireless ("BT wifi"), Bluetooth low energy ("BLE") and/or near-field communication ("NFC") network.

Thus, those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method comprising:
providing a database comprising a user list and a user device list, the user list comprising a list of one or more user biometric identifiers, each user biometric identifier extracted from and unique to a respective template of a user biometric of a verified user, and the user device list comprising a list of one or more user biometric identifiers each extracted from and unique to a respective template of a user biometric of a verified user device associated with the verified user; and
determining, via an interpreter/matcher one of (1) whether a user biometric identifier of a known user biometric received from an unverified user device matches a user biometric identifier on the user device list to verify the unverified user device and (2) whether a user biometric identifier extracted from and unique to a new user biometric template received from a verified user device matches a user biometric identifier in the stored user list to verify the new user biometric template.

2. The method of claim 1 wherein the template of the user biometric comprises information relating to the biometric characteristics of a user biometric sensed by a trusted user biometric image sensor.

3. The method of claim 2 wherein the template of the user biometric is created in the trusted biometric image sensor.

4. The method of claim 1 wherein the service provider database is connected to a service provider server.

5. The method of claim 1 wherein verifying a new user device adds the new user device to the user device list in the service provider database comprising a cluster of user devices associated with the user.

6. The method of claim 1 wherein verifying the new user biometric template adds to the user list in the service provider database another user biometric associated with the user.

7. The method of claim 1 wherein the user biometric identifier is an encrypted version of the user biometric template.

8. A system comprising:
 a service provider database storing a user list and a user device list, the user list comprising a list of one or more user biometric identifiers, each user biometric identifier extracted from and unique to a respective template of a user biometric of a verified user, and the user device list comprising a list of one or more user biometric identifiers each extracted from and unique to a respective template of a user biometric of a verified user device associated with the verified user; and
 an interpreter/matcher configured to determine one of (1) whether a user biometric identifier of a known user biometric received from an unverified user device matches a user biometric identifier on the user device list to verify the unverified user device and (2) whether a user biometric identifier extracted from and unique to a new user biometric template received from a verified user device matches a user biometric identifier in the stored user list to verify the new user biometric template.

9. The system of claim 8 wherein the template of the user biometric comprises information relating to the biometric characteristics of a user biometric sensed by a trusted user biometric image sensor.

10. The system of claim 9 wherein the template of the user biometric is created in the trusted biometric image sensor.

11. The system of claim 8 wherein the service provider database is connected to a service provider server.

12. The system of claim 8 wherein verifying a new user device adds the new user device to the user device list in the service provider database comprising a cluster of user devices associated with the user.

13. The system of claim 8 wherein verifying the new user biometric template adds to the user list in the service provider database another user biometric associated with the user.

14. The system of claim 8 wherein the user biometric identifier is an encrypted version of the user biometric template.

15. A method comprising:
 storing in a service provider database a user list and a user device list, the user list comprising a list of one or more user biometric identifiers, each user biometric identifier extracted from and unique to a respective template of a user biometric of a verified user, and the user device list comprising list of one or more user biometric identifiers each extracted from and unique to a respective template of a user biometric of a verified user device associated with the verified user; and
 determining, via an interpreter/matcher, whether a user biometric identifier extracted from and unique to a new user biometric template, received from a verified user device, matches a user biometric identifier in the stored user list to verify the new user biometric template; and
 authorizing a verified user device containing a stored master template identified by the user biometric identifier contained in the user list to transfer to the user device which transmitted the verified new user biometric template, a verified master template, to create a new root of trust and user biometric identifier for storage in the user list and the user device list.

16. The method of claim 15 wherein the transfer is accomplished by way of a short range wireless network.

17. The method of claim 16 wherein the short range wireless network is one of a Bluetooth wireless ("BT wifi"), Bluetooth low energy ("BLE") and near-field communication ("NFC") network.

18. A system comprising:
 a service provider database configured to store a user list and a user device list, the user list comprising a list of one or more user biometric identifiers, each user biometric identifier extracted from and unique to a respective template of a user biometric of a verified user, and the user device list comprising list of one or more user biometric identifiers each extracted from and unique to a respective template of a user biometric of a verified user device associated with the verified user; and
 an interpreter/matcher configured to determine whether a user biometric identifier extracted from and unique to a new user biometric template, received from a verified user device, matches a user biometric identifier in the stored user list to verify the new user biometric template; and
 a transfer authorizing unit, configured to authorize a verified user device containing a stored master template identified by the user biometric identifier contained in the user list to transfer to the user device which transmitted the verified new user biometric template, a verified master template, to create a new root of trust and user biometric identifier for storage in the user list and the user device list.

19. The method of claim 18 wherein the transfer is accomplished by way of a short range wireless network.

20. The method of claim 19 wherein the short range wireless network is one of a Bluetooth wireless ("BT wifi"), Bluetooth low energy ("BLE") and near-field communication ("NFC") network.

* * * * *